United States Patent
Studer et al.

(10) Patent No.: US 11,630,066 B2
(45) Date of Patent: Apr. 18, 2023

(54) LARGE-FIELD 3D SPECTRAL MICROSCOPY

(71) Applicants: ALVEOLE, Paris (FR); CENTRE NATIONAL DE LA RECHERCHE SCIENTIFIQUE-CNRS, Paris (FR); UNIVERSITÉ DE BORDEAUX, Bordeaux (FR)

(72) Inventors: Vincent Studer, Bordeaux (FR); Rémi Galland, Pessac (FR)

(73) Assignees: ALVEOLE, Paris (FR); CENTRE NATIONAL DE LA RECHERCHE SCIENTIFIQUE—CNRS, Paris (FR); UNIVERSITÉ DE BORDEAUX, Bordeaux (FR)

( * ) Notice: Subject to any disclaimer, the term of this patent is extended or adjusted under 35 U.S.C. 154(b) by 248 days.

(21) Appl. No.: 16/772,397

(22) PCT Filed: Dec. 14, 2018

(86) PCT No.: PCT/EP2018/085062
§ 371 (c)(1),
(2) Date: Jul. 15, 2020

(87) PCT Pub. No.: WO2019/115807
PCT Pub. Date: Jun. 20, 2019

(65) Prior Publication Data
US 2021/0131967 A1   May 6, 2021

(30) Foreign Application Priority Data
Dec. 14, 2017   (FR) ..................... 1762162

(51) Int. Cl.
*G01N 21/64*   (2006.01)
*G02B 21/02*   (2006.01)
(Continued)

(52) U.S. Cl.
CPC ......... *G01N 21/6458* (2013.01); *G02B 21/02* (2013.01); *G02B 21/16* (2013.01);
(Continued)

(58) Field of Classification Search
CPC ....... G01N 21/6458; G01N 2021/6463; G02B 21/02; G02B 21/16; G02B 21/36;
(Continued)

(56) References Cited

U.S. PATENT DOCUMENTS 10,933,417 B2 *   3/2021   Goel ................ B01L 3/502738
2009/0286245 A1 *  11/2009  Bjornson ............ C12Q 1/6874
                                                     435/6.1
(Continued)

FOREIGN PATENT DOCUMENTS

| CN | 104568872 A | 4/2015 |
| JP | H11249023 A | 9/1999 |
| WO | 2017205858 A1 | 11/2017 |

OTHER PUBLICATIONS

Gibson et al. "A multi-object spectral imaging instrument", IOP Publishing, J. Opt. 15, 2013, p. 1-6 (Year: 2013).*
(Continued)

*Primary Examiner* — David P Porta
*Assistant Examiner* — Mamadou Faye
(74) *Attorney, Agent, or Firm* — Osha Bergman Watanabe & Burton LLP

(57) ABSTRACT

Optical device for optical fluorescence microscopy, comprising a spatial modulator (1), a microscope objective (2), a beamsplitter (3) and a camera (4), wherein the beamsplitter (3) is placed between the spatial modulator (1) and the microscope objective (2), wherein the beamsplitter (3) is placed between the camera (4) and the microscope objective (2), and wherein a prism (5) is placed between the beamsplitter (3) and the camera (4).

9 Claims, 1 Drawing Sheet

(51) Int. Cl.
  *G02B 21/16* (2006.01)
  *G02B 21/36* (2006.01)
  *G02B 26/08* (2006.01)
  *G02B 27/14* (2006.01)

(52) U.S. Cl.
  CPC ......... *G02B 21/36* (2013.01); *G02B 26/0833* (2013.01); *G02B 27/141* (2013.01); *G01N 2021/6463* (2013.01)

(58) Field of Classification Search
  CPC ..... G02B 26/0833; G02B 27/141; G01J 3/14; G01J 3/2823; G01J 3/28
  See application file for complete search history.

(56) References Cited

U.S. PATENT DOCUMENTS

| | | | | |
|---|---|---|---|---|
| 2011/0090499 | A1* | 4/2011 | Van Der Mark | A61B 5/0059 356/326 |
| 2017/0343784 | A1 | 11/2017 | Wu et al. | |
| 2019/0391078 | A1* | 12/2019 | Cohen | G02B 21/365 |

OTHER PUBLICATIONS

G. M. Gibson et al. "A multi-object spectral imaging instrument" Journal of Optics; School of Physics and Astronomy, SUPA, University of Glasgow; Jul. 30, 201 (6 pages).

N. Bedard et al. "Image mapping spectrometry: calibration and characterization" Optical Engineering, vol. 51; Nov. 2012 (14 pages).

N. Chakrova et al. "Development of a DMD-based fluorescence microscope" Three-Dimensional and Multidimensional Microscopy: Image Acquisition and Processing XXII; Proc. of SPIE vol. 9330; Mar. 2015 (11 pages).

L. Gao et al. "Snapshot Image Mapping Spectrometer (IMS) with high sampling density for hyperspectral microscopy" Optics Express, vol. 18, No. 14; Jul. 2010 (15 pages).

International Search Report issued in International Application No. PCT/EP2018/085062, dated Mar. 18, 2019 (6 pages).

Written Opinion issued in International Application No. PCT/EP2018/085062; dated Mar. 18, 2019 (7 pages).

Office Action in counterpart Chinese Patent Application No. 201880089488.6 dated Nov. 23, 2021 (18 pages).

Office Action issued in Japanese Application No. 2020-532902; dated Oct. 11, 2022 (9 pages).

* cited by examiner

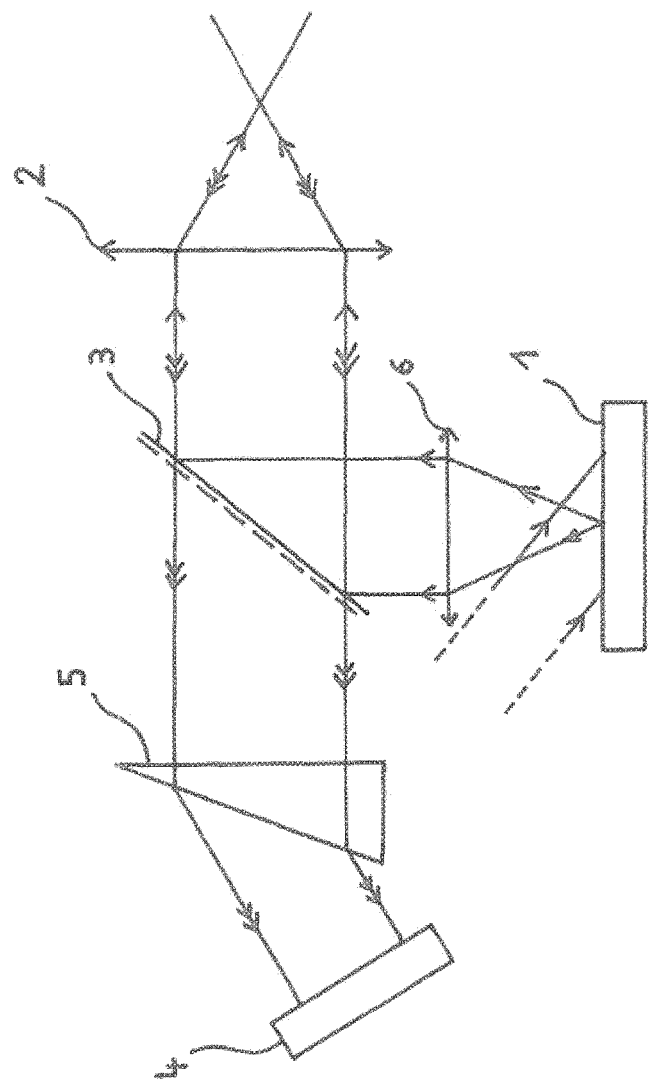

LARGE-FIELD 3D SPECTRAL MICROSCOPY

TECHNICAL FIELD

The invention relates to the field of wide-field optical fluorescence microscopy and in particular wide-field spectral fluorescence microscopy, in which an image of a fluorescent object is recorded at a plurality of wavelengths by a linear- or matrix-array detector of a camera. Most particularly, the invention is applicable to wide-field three-dimensional (3D) spectral (or multicolor or pseudo-color) fluorescence microscopy.

Fluorescence microscopy is employed in at least two types of microscopes, wide-field microscopes and confocal microscopes. In wide-field microscopes, the field is defined by a two-dimensional (2D) field diaphragm. In confocal microscopes, the field diaphragm is reduced to one dimension (slit) or zero dimensions (hole-shaped diaphragm).

It is particularly simple to use a dispersive element or a spectrometer of any type with a confocal microscope, to form a spectral imager therefrom. Specifically, it is enough to use a monochromatic detector having one dimension more than the field diaphragm and to disperse the components of the spectrum of the light in this dimension with a known prior-art dispersive element (prism, grating, Michelson interferometer, etc.). For example, with a confocal microscope employing a hole, it is possible to use a linear array to collect the spectrum dispersed by a prism illuminated by the hole. In another example, with a confocal microscope employing a slit, it is possible to use a two-dimensional or matrix array to collect the spectrum dispersed by a prism illuminated by the slit not placed parallel to the direction of dispersion of the prism.

In contrast, it is impossible, in the prior art, to use a dispersive element with a wide-field microscope, without severely decreasing the resolution of the recorded images, none of the dimensions of a two-dimensional (2D) or matrix-array detector or camera being available to record the spectral components of the image, the whole 2D field of the detector being occupiable by the image.

In practice, in the prior art, the conversion of a wide-field microscope, associated with a monochromatic matrix-array detector, into a microscope that is sensitive or gives access to the spectral content of the fluorescence light emitted by an object into all of the field of the microscope is therefore a difficult problem.

Wide-field spectral microscopy, which a priori allows the points of an image to be recorded at a rate higher than, sequential, confocal microscopes, would however be a desirable technique for recording dynamic objects, most particularly in three dimensions.

Definitions

Throughout this patent application, which relates to the field of optics, the words "placed between", when applied to elements of an optical device, designate a spatial arrangement of these elements that is suitable for allowing them to accomplish an optical function, in particular optical conjugation, transmission, deviation, dispersion or reflection.

In the present patent application, the following terms have the following meaning: Color or pseudo-color: a measurement by a camera of the spectral distribution of fluorescence light. It will be understood that fluorophores of different natures will have different colors.

Beamsplitter: an optical plate or dichroic mirror treated to partially reflect and partially transmit incident light, the spectral characteristics of the transmitted and reflected light being different. When used in fluorescence microscopy, such a beamsplitter will for example be optimized to reflect with few losses (i.e. as few as possible) an excitation or illumination spectrum and to transmit with few losses a fluorescence spectrum. A beamsplitter or dichroic plate beamsplitter relative to an illumination light and a fluorescence light is placed in front of a camera. In practice, the beamsplitter or dichroic plate beamsplitter will be a stack of thin optical layers serving to isolate the camera from the illumination light in order to allow the fluorescence light, which is several orders of magnitude lower in intensity, to be detected without saturating the camera.

Camera or monochromatic camera: an optical device equipped with a matrix-array (i.e. two-dimensional or 2D) detector composed of camera pixels and unable to distinguish between the colors received by a camera pixel or recorded by the camera, the image being recorded in terms of energy level integrated over the entire received spectrum (also called grayscale), the detector embodying the camera pixel having the highest possible quantum efficiency.

Prism: a dihedral optical element that disperses light in a plane perpendicular to the ridge of the dihedra because of the variation of its refractive index with wavelength or the color of the light that it transmits.

Spatial modulator: an optical element capable of applying spatially variable energy differences to light transmitted or reflected by the element. Such an element allows, from a large source, a pattern of arbitrarily chosen pixels (a pixel being the smallest dimension or period of modulation of the element) to be obtained. Examples of spatial modulators are in particular a spinning disk or a digital micromirror device (DMD) or even a spatial light modulator (SLM). A modulator may in particular select a single point or pixel, but also a discrete object or discrete pattern or discrete modulated object or discrete modulated pattern consisting of a set of points or pixels that are spatially separate and regularly distributed, which lends itself to the removal of a continuous background from the image of the object. The DMD thus allows a set of chosen points to be illuminated in parallel, without moving the object.

Grid: a discrete object (or its various images) composed of a set of pixels located on a two-dimensional matrix array coinciding with the nodes of a network of points that, in general, is located in a plane.

BACKGROUND

In the prior art imaging devices are known that comprise a microscope that uses a matrix array of reflective micromirrors, said matrix array being placed on an illumination or excitation optical path of the microscope. The microscope also possesses an imaging path for collecting, for example, fluorescence light induced by the illumination, using a matrix array of sensors or pixels of a (CMOS, CCD, etc.) camera. The fluorescence light has a spectral band that is variable or a color that is different depending on the nature of the various molecules subjected to the illumination and on the spectral composition of the one or more excitation light sources.

It is important for the quality of a spectral microscopy system using fluorescence to ensure not only that images of a given object point are formed in various spectral bands but also to ensure that said images of the given point of the object are kept spatially superposed within a precision of one pixel of the camera, i.e. that each point of the object is kept spatially referenced.

In the prior art, the use of a monochromatic camera to produce a spectral system requires the spectral images to be recorded in sequence, using interference filters, then it requires these images to be superposed in a viewing system to recreate a simultaneous image of all the spectral bands by referencing them with one another. It is thus known that, in order not to degrade the resolution of the interference-filter-based systems, the filters must be almost perfectly parallel, i.e. within about a few seconds of arc. These filters are called zero-shift filters because their apex angle is almost zero, inducing a shift of zero or of smaller than one camera pixel when they are introduced into the beam.

Therefore, in the prior art, the introduction of an imperfectly parallel element onto the imaging optical path of a microscopy system with a resolution limited by the camera and that is using fluorescence was considered to be disadvantageous. More generally, to perform fluorescence imaging with a monochromatic camera, the elements that could be introduced onto the optical path, to select a spectral band, were presumed, in the prior art, to need to cause a shift of zero pixels on the camera (i.e. zero-shift elements). This condition led to the assumption that the elements that could be introduced onto the optical path had to be zero-shift and to cause zero dispersion in shift as a function of wavelength, just like zero-shift interference filters (such as for example the filters sold by Semrock in the USA) the parallelism of which is zero-pixel, or in practice less than a few seconds of arc ($\frac{1}{60}^{th}$ of a milliradian). Such a property is in practice obtained by sorting filters once produced, because it is not possible to obtain it with the manufacturing precision available industrially for plates with planar and parallel faces.

Prisms and other dispersive elements (gratings, etc.) are also known in the prior art, but said elements are not, in the prior art, able to meet the parallelism tolerance required for zero-shift systems. Most particularly, the prism, which both deviates beams over a large angle and is wavelength dispersive, seems particularly unsuitable for zero-shift systems.

Lastly, the interference filters have to be introduced in sequence on the optical path, and this results in a substantial limitation of the acquisition rate, which is limited by the speed of retraction of the filters. This limitation thus, in practice, also slows down such systems for 3D microscopy, in which the measurement points are located in planes parallel to an object plane, along the optical axis of the microscope or "Z axis", perpendicular to the object plane.

General Presentation

In this context, the invention relates to a wide-field fluorescence microscope for observing an object plane in a three-dimensional object medium able to emit fluorescence light in response to illumination light, which comprises a first optical channel for the illumination light, a second optical channel for the illumination light and the fluorescence light and a third optical channel for the fluorescence light, wherein the first channel comprises a spatial modulator that limits the field of the wide-field microscope, wherein the second channel extends between the object plane and a beamsplitter, which is dichroic with respect to the illumination light and to the fluorescence light, wherein the third channel extends between the second channel and a camera able to detect the fluorescence light, wherein the microscope comprises an optical means for conjugating the spatial modulator with the object plane for the illumination light and for conjugating the object plane with the camera for the fluorescence light and wherein the third channel comprises an optical element that is dispersive to the fluorescence light.

In variants:

the optical means comprises a microscope objective placed in the second channel.

the optical means comprises a first microscope objective placed in the first channel and a second microscope objective placed in the second channel.

the dispersive optical element is a prism.

the spatial modulator is a digital micromirror device (DMD).

the spatial modulator is a spinning disk.

The invention also relates to a method for calibrating, at a first wavelength, the wide-field microscope, comprising the following steps:

placing in a vicinity of the object plane an object medium able to emit fluorescence light in a first spectral band containing the first wavelength, in response to first illumination light, placing in the third channel a first interference filter able to spectrally select a vicinity of the first wavelength, sequentially illuminating, with the first illumination light, each point of the wide field of the microscope in the object plane, by means of the spatial modulator, recording a first image of each point of the wide field of the microscope, with the camera, removing the first interference filter from the third channel.

In one variant of the method, the invention also relates to a method for calibrating at a second wavelength the wide-field microscope, consisting in repeating the steps of the calibration at the first wavelength, with a second interference filter able to spectrally select a vicinity of the second wavelength, in order to obtain a second image of each point of the wide field of the microscope, said image being recorded with the second interference filter on the camera.

The invention also relates to a method for using the wide-field microscope calibrated at the first wavelength and at the second wavelength, comprising the following steps:

placing, in the vicinity of the object plane, a sample able to emit fluorescence light in a wavelength spectrum comprising the vicinity of the first wavelength and the vicinity of the second wavelength, in response to illumination light, illuminating the wide field of the microscope according to a grid of points, by means of the spatial modulator, recording the image of each point of the grid for the wavelength spectrum, with the camera, repeating the above two steps while applying translations to the grid in the wide field of the microscope, by means of the spatial modulator, until, for the wavelength spectrum, one image has been recorded of each point of the wide field of the microscope with the camera, deducing, by image processing, a first image of a point of the sample at the first wavelength, from the first image of this point at the first wavelength, said image being obtained using the calibrating method and the image of this point for the wavelength spectrum, deducing, by image processing, a second image of the point of the sample at the second wavelength, from the image of this point at the second wavelength, said image being obtained using the calibrating method and the image of this point for the wavelength spectrum.

In one variant, the invention relates to a method for obtaining a spectral image of a sample, said image being selected along an optical axis of the wide-field microscope, wherein the image processing comprises the following step:

removing the background contained in the images recorded by the camera.

BRIEF DESCRIPTION OF THE DRAWINGS

The invention will be better understood with reference to the appended drawings, the reference numbers appearing in these drawings. The appended drawings are schematic and are not to scale, they aim above all to illustrate the principles of the invention.

FIG. 1 shows an example of a fluorescence microscopy system.

DETAILED DESCRIPTION OF ONE OR MORE EXAMPLES

The example of a fluorescence microscopy system shown in FIG. 1 comprises a spatial modulator 1 conjugated with the object focal plane of a microscope objective 2 forming an image of its object focal plane, on a camera 4, via a beamsplitter 3 and comprising a dispersive element that is, in FIG. 1, a prism 5 placed between the beamsplitter 3 and the camera 4.

The spatial modulator 1 is optically conjugated with the object focal plane of the microscope objective 2, via a lens 6 (at the focal point of which the spatial modulator 1 is placed), via the beamsplitter 3 that acts in reflection on this channel, which is referred to as the illumination channel, and via the microscope objective 2. The beamsplitter 3 acts to reflect illumination light that is reflected by the spatial modulator 1, here a DMD or digital micromirror device. The illumination light is delivered to the spatial modulator 1 by a light source (not shown in FIG. 1).

The beamsplitter 3 also acts to transmit fluorescence light emitted by a fluorescent object exposed to the illumination light and placed in the object focal plane.

The illumination light and the fluorescence light are transmitted in opposite directions between the beamsplitter 3 and object focal plane of the microscope objective 2, in particular through the microscope objective 2.

A known optical means (not shown in FIG. 1) such as a notch filter can be used, if necessary, to ensure that no illumination light is detectable by the camera 4.

FIG. 1 shows an example of an optical device for fluorescence optical microscopy comprising a spatial modulator 1, a microscope objective 2, a beamsplitter 3 and a camera 4, wherein the beamsplitter 3 is placed between the spatial modulator 1 and the microscope objective 2, wherein the beamsplitter 3 is placed between the camera 4 and the microscope objective 2, and wherein a prism 5 serving as dispersive element is placed between the beamsplitter 3 and the camera 4.

The spatial modulator 1 is placed on or in an illumination optical path or channel that ends at a first face or a side of the dichroic beamsplitter 3. There is an illumination and fluorescence optical path or optical channel between this first face of the beamsplitter 3 and the object plane, here the object focal plane of the microscope objective 2, and there is between the second face or the second side of the beamsplitter 3, up to the camera 4, a third fluorescence optical path or optical channel. In normal optical operation, only the illumination light travels through the first optical channel, only the fluorescence light travels through the third channel and both types of light travel through the second channel, here in opposite directions. Equivalently, it would be possible, rather than collecting the fluorescence light with the microscope objective 2, to collect it on the other side of the object focal plane with another microscope objective and another camera, another dichroic beamsplitter being used to block the illumination light (this other dichroic beamsplitter here being able to be employed at an inclined but also at a normal incidence) and thus, in the same way, to ensure only fluorescence light reaches the other camera.

With reference to FIG. 1, a first embodiment relates to a fluorescence microscopy system comprising the spatial modulator 1, which is a DMD or digital micromirror device, conjugated with the object focal plane of the microscope objective 2, via the lens 6 and the beamsplitter 3. A liquid crystal-based spatial light modulator or another amplitude modulator acting in reflection or in transmission would be suitable for the present embodiment.

The DMD is illuminated by a light beam suitable for exciting fluorophores and of wavelength commonly comprised between 350 nm and 800 nm. It is conjugated with the object focal plane of the microscope and therefore with the object, that it allows to be illuminated selectively with various patterns of points that are spaced apart in two dimensions.

This beam allows the fluorescence of an object to be excited in the object focal plane at the points selected by known electronics associated with the DMD. Commonly, the illumination beam consists of a plurality of laser beams grouped together on the same optical path, in order to be able to each excite one fluorophore when the latter is present in the object. A source composed of a plurality of lines may also be suitable, if the power of this source is sufficient.

This channel, which is referred to as the microscope illumination channel, therefore allows excitation light to be conveyed to the object focal plane of the microscope objective 2. On this path, the half-silvered mirror or plate beamsplitter or return-beam splitter or beamsplitter 3 reflects, without dispersion, the illumination beam.

As known in the prior art, the beamsplitter transmits the fluorescence light without significant dispersion.

The beamsplitter is typically a dichroic mirror associated with an interference filter placed between the dichroic mirror and the source, which may be a mercury vapor lamp, a source composed of one or more collimated LEDs or a rectilinear beam obtained by mixing one or more laser beams.

The objective 2 thus forms, after excitation of the fluorescence of the object, which is not shown, an image on a camera 4 of a section of this object in the object focal plane for the wavelengths of the fluorescence spectrum, the microscope comprising, for this purpose, a so-called tube lens that forms the image on the CCD or CMOS matrix array of the camera. Commonly, this spectrum is the visible spectrum, and the image is formed, on the camera 4, via the beamsplitter 3, which plays the role of a wavelength selective mirror that is able to select between the excitation spectrum and the fluorescence spectrum. For example, the beamsplitter may be placed at an angle of 45° to the optical axis, this causing the reflected beam to be reflected at 90° or right angles. Any other value of the inclination of the normal to the plane of the beamsplitter that allows the camera 4 to be illuminated with the fluorescence spectrum, i.e. to split the illumination and the beam emitted by an object in the focal plane of the objective 2, from the excitation beam, is also suitable.

The introduction of the prism 5 into the imaging channel split from the illumination beam by the beamsplitter 3 causes a deviation of the image, a dispersion of wavelengths in the image, and the formation, on a plurality of pixels of the camera 4, of a polychromatic image taking the form, for a given point of the object, of a set of images at wavelengths that are offset with respect to one another. Any spatial and spectral reference is therefore lost for the images in question, and the images of contiguous pixels become mixed and blurred.

Two difficulties must therefore be overcome: the lateral offset between the images, which is observable from their angle about the ridge of the prism or the straight line of intersection of the planes of its faces, must be determined; and each image must be selectively recordable at each of the wavelengths of a given pixel.

A particular way of using the DMD to selectively record images at each of the various wavelengths (split angularly by the prism, then split spatially on the detector of the camera via the focus of an objective of the camera) of a given pixel and to superpose these images is thus firstly described below. Subsequently, a calibrating method allowing an absolute spectral reference to be found by locating one color, then a relative spectral reference to be found by locating a second color, will be described. Such a method may be generalized to any number of colors, provided that the various (received monochromatic or grayscale) images can be split or distinguished by the camera.

To selectively record the images at each of the various wavelengths of a given pixel and to superpose them, since the dispersion of the prism conventionally occurs in a single direction, in a plane perpendicular to its ridge; DMD images, or images of points illuminated in the object by the DMD, that are spatially separated points, or combs (pixels separated from one another and arranged on a straight line) or grids of pixels, are used. It is thus possible to locate the dispersed image between the illuminated points in the image, the distance of which gives the spectral range left free to adjust the dispersion of the prism. Without loss of generality, the best result is obtained with images on the DMD that are grids, since it is possible, by translating a grid, to "tile" an image, i.e. cover all of the points of the modulator using translated grids. Thus, below, images or patterns on the DMD that form grids will be considered.

It is then possible either to suitably align a direction of a side of a square or rectangular grid with the direction of dispersion of the prism, or else the direction of a diagonal in order to maximize the free spectral range between two points of the grid. It is also possible to use images of grids of spaced-apart points arranged in a hexagonal pattern or network, to obtain a maximum distance between two points of the grid and therefore a wider free spectral range.

This type of illumination of spaced-apart points allows blurring at the spectral level to be avoided, the image segment of a point of the object at the various wavelengths, i.e. the segment obtained via the dispersion by the prism, being located between the various spaced-apart points illuminated in the object by means of the DMD, which is optically conjugated with this object and placed in the excitation or illumination channel.

Preferably, the minimum resolution is not limited by the DMD, a plurality of pixels of the camera being able to cover a single pixel of the DMD in the image. In this way, it is possible to use the dynamic range of the pixels of the camera to interpolate the spectral position of the image of a point and to improve the final resolution. For example, it is possible to adjust the magnification so that the image of a pixel of the DMD extends over a square of four pixels of the camera (i.e. a square of 2 pixels by 2 pixels).

However, for these images, the inter-wavelength spatial reference is necessary and below a method allowing this calibration or spatial or spectral reference to be determined is described, each wavelength being coded by its position on the camera, by virtue of the prism, which is dispersive, i.e. which separates the light rays at various wavelengths angularly.

In this method, an optical bandpass fluorescence filter or color filter that is centered on a given wavelength and the passband of which is narrow about this wavelength is inserted between the beamsplitter and the camera, i.e. in the imaging channel of the microscope, and, using the DMD, a single pixel or a comb of points or a grid of points or a known object that is spaced apart or discrete in terms of pixels of the DMD, is generated.

The chosen filter or filters are zero-shift filters, i.e. they each have such a parallelism between their faces that their introduction onto the optical path does not deviate the image of a point of the object by more than half the resolution of the imaging system. Such filters are known in the prior art and sold by Semrock in the USA. It will be noted that, for plates with planar and parallel faces, the wavelength dispersion is proportional to the angle of the prism and therefore potentially negligible, this making it possible to ensure that a zero deviation leads to a zero dispersion and therefore to an operation suitable for systems that are of very high resolution or that cause a shift of zero over the pixels of the camera used.

In the object plane of the microscope conjugated with the modulator, i.e. the object focal plane in current microscopes, there may be placed a solution containing two fluorophores or fluorochromes that is such as to ensure, for the illumination of the microscope, that a fluorescence spectrum is obtained at a first color and a second color, whatever the single point selected on the DMD and therefore illuminated in the object plane.

It is then possible to use the illumination source of the microscope, which allows fluorescence to be excited for an unknown object containing the same fluorophores as the calibration solution, and to obtain images for each color at each point of the unknown object.

For example, it is possible to illuminate a single point of a pixel of the DMD and to record the image of such an object or spectral response of the system for this point, which response is coded or marked spatially on the monochromatic camera, for a given known first color filter inserted in the imaging channel, i.e. between the beamsplitter and the camera.

In this way, it is possible to determine a first image of a point of the DMD through all of the optics, with the camera, for the central wavelength of the first color filter, which is tailored to the fluorescence at a first color, which is defined by this filter. Thus, an absolute spatial reference associated with the camera at the first color is obtained.

Thus, the position of the image of a pixel of the DMD on the camera is obtained at a first wavelength, which is the central wavelength of the first filter.

For a wavelength or color scale, on the camera, two solutions are practicable: Either the spectral position of the images is extrapolated from the first wavelength by computation on the basis of the parameters of the prism and the wavelength dispersion, with its sign, of the prism. Knowledge of the index of the prism and its apex angle allows, as is known, such a prediction of the wavelength dispersion of the position of the images at a second color or at others.

Or two wavelengths are interpolated between by performing a second measurement or recording a second image, at a second wavelength with a second color filter tailored to the fluorescence of the second fluorophore.

After these operations, it is therefore possible to obtain, of an object point, an image that is spatially deviated in the presence of the prism with respect to the image of the point without prism, but for which image the images, in the various spectral bands, of the point of the object are superposed, to within one pixel of shift, with one another on the camera. There is therefore a relative shift of zero pixels between the spectral images of a given point. The spectral reference may be an arbitrary wavelength. The spatial reference of the prior art, namely the image without prism, is therefore replaced, in this embodiment, by a spectral reference of one of the images of the object in one of the spectral bands, in which the other spectral or color images are superposed.

To obtain the spectral response of the DMD at every point, each of the points thereof may be illuminated in sequence. Since this operation is carried out only once, it may be performed in an unconstrained amount of time and for each point. In practice, it has been observed that it is sufficient to record this response every 10 pixels or more and to proceed with an interpolation between the calibrated points for the other points, the spectral response varying slowly between the points for well-adjusted, high-quality optical components.

It is thus possible to carry out this determination for a plurality of wavelengths, at a given point. Each recording in addition to the first allows a spectral translation with respect to the first wavelength recorded at each point of the image to be determined. To this end, it is possible to use a plurality of color filters, each centered on a transmission wavelength of a fluorophore. Such filters are usually available for a fluorescence microscope.

After the calibrating phase, all the absolute positions of the image points (in grayscale) of all the objects of 1 pixel of the DMD, which positions are obtained via the color filters, are known or computable as a function of wavelength. They are suitably stored in a computer memory. If one of the wavelengths is taken as reference, then all the relative positions of the color points may also be stored.

It is thus possible, by mapping, to associate, with a pixel of the modulator, a set of positions of the images thereof as a function of wavelength. Conversely, recording the positions of the images of a pixel on the camera allows them to be associated with a pixel color in a color-image processing system and a color image of the pixel to be obtained, provided that the image of each color is separable from the other color images of the other pixels imaged (in grayscale) at a given time on the camera.

In practice, the dispersion depends on the position in the field (because of the geometric aberrations of the lenses). It is therefore not generally possible to consider strips of contiguous pixels. It is therefore generally necessary to use objects or patterns made up of spaced-apart DMD points for the calibration: a point, a comb or a matrix array or grid of points, and to determine the spectral dispersion for each position of the field either experimentally, by interpolation between a plurality of measurements with different colors, or by computation and extrapolation. Any a priori knowledge of the optical impulse response of the elements may be used to determine the number of DMD calibration points used and the duration of this operation.

It is in particular possible to perform the calibration with more than two fluorophores to obtain an instrument having the capacity to image more than two colors and in particular to perform the calibration with each color filter available in a particular microscope or with each fluorophore of a given sample.

To acquire the images, it is possible to form luminous grids of 1 pixel separated for example by 4 to 5 diffraction spots of the microscope, in particular with a square matrix array or on a hexagonal matrix array. Once the pitch of the grid has been chosen depending on the resolution of the optical system, the angle of the prism is chosen so that all the image color points of a fluorescence spectrum of a point are contained in the chosen grid without overlap with a point of the grid at another wavelength, when they are dispersed by the prism. In this way, it is possible to record all the color points of the grid at once, at the acquisition rate of the camera.

In practice, for 3D microscopy, it is the need to separate the source points of the fluorescence background outside the focal plane that sets, as known, the distance between the points of the grid.

To record a square or rectangular image, or an image of any other shape, it is possible to translate a grid in non-collinear directions until the color images of all the points of the square or rectangular image, or of the image of any other shape, this shape being given by the shape of the sensor of the camera, have been recorded.

If a plurality of pixels of the camera cover one pixel of the DMD in the image, it is possible to use the intensity, in these pixels, of the camera to improve the spatial resolution beyond that of the DMD, by virtue of the camera.

It is thus possible, without any color mask or movable parts, and knowing, via a single calibration the translations or positions associated with each wavelength on a given pixel of the camera, to choose a reference wavelength, i.e. the first calibrated wavelength, and to superpose the color images the places of which are known relative to one another, this wavelength being taken as reference, by translating them over the reference image in an image-processing system. It is possible to take image sequences or hyperspectral and multicolor video images in 3D with the device.

It will be noted that the filters to be used for the calibration, which are centered on the emission bands of the main fluorophores, in limited number, are generally present in a fluorescence imaging system in a microscope and that the calibration is all the more applicable to a high number of existing devices, by way of accessory allowing color imaging or video capture at the maximum acquisition frequency of the camera.

It will be noted that the spectral calibration of the optical system including the filter may be performed before its first use and just once, by the manufacturer or the user of a fluorescence microscope, with a given calibration object. It is possible for a manufacturer to perform a calibration with a set of standard filters the parallelism of which is as perfect as possible and the spectral transmission of which is representative of all the filters produced. It is possible for a user to perform a calibration with the filters delivered with the microscope, their parallelism just having to be assumed.

In any case, the calibration may be performed asynchronously with the measurements and the measurements may be taken without any color filter, using the dispersion of the prism to distinguish between the fluorescence spectra or colors or central wavelengths received by each camera pixel and the recorded reference images. In practice, once again, a filter and a dichroic mirror, allowing the one or more excitation wavelengths to be removed, are generally necessary.

The invention therefore obtains, with a monochromatic camera, the capacity to image in color, at a rate dependent on the speed of the camera.

To produce a 2D image it is thus necessary to record all the positions of the illumination grid. In a typical case, about 200 camera images are required to obtain a 2D image. Therefore, the actual imaging rate is ½00th of the camera speed, this imaging rate being obtained by synchronizing the camera with the modulator electronically. In practice, the camera is therefore synchronized with the DMD.

Noteworthily, for discrete patterns, the spectral or multi-color images obtained in 2D are confocal (i.e. sectioned or sectionable in z or in the direction of the optical axis or depthwise) and suitable for 3D microscopy. For a grid, for example, the images necessarily being patterns of spaced-apart points for the above reasons of free spectral range, they are in fact naturally suitable for filtering of the discrete spatial frequencies of the lighting grid with respect to the continuous background of the out-of-plane fluorescence generated by planes different from the object plane and perpendicular to the optical axis. It is therefore possible to move the microscope with respect to the object, or the object with respect to the microscope, using known means, to obtain, after filtering, 3D color images of a fluorescent object.

In practice, the sectioning improves as the number of points simultaneously illuminated in the image by the DMD decreases, but the acquisition rate is correspondingly slower, the DMD or the camera limiting the latter. It is possible, via simple execution operations, to adjust, for a given z-sectioning, the period of the grid, and to observe the acquisition rate that results therefrom, or to set the rate and to proceed with the z-sectioning obtained therewith.

It will be understood that the separability of the images resulting from the various colors of the object, which are firstly separated angularly by the prism, then spatially with the camera, or which are separated in z (sectioned) along the optical axis of the microscope, may be variable. This criterion may be evaluated in the same terms as the resolution limit of the optical images, in order to check whether a chosen spatial-modulator pattern is suitable for implementing the invention for a given prism and for given optical characteristics, so as to allow the invention to be applied as widely as possible. The pattern may be adapted at the start of the calibration by virtue of this criterion, prior to the measurements performed on the objects to be imaged by the microscope.

The invention is industrially applicable to the field of 3D microscopes for observing in color fluorescence.

In the present patent application, the words "light source" are also understood to mean a plurality of (coaxial) light sources the emission spectrum of which comprises a first spectral band and a second spectral band, with a view to obtaining the excitation of the fluorescence of the first fluorophore at the first color and of the second fluorophore at the second color.

It will be understood, as meant in the present patent application, that a "light source the emission spectrum of which comprises a first spectral band and a second spectral band" may be obtained by superposing a first light beam of a first light source that emits in the first spectral band and a second light beam of a second light source that emits in the second spectral band, without departing from the scope of the teaching of the present patent application. In particular, a light source, as meant in the present patent application, may be obtained using a plurality of laser sources of different wavelengths and made coaxial.

It will be understood, in the context of the present patent application, that when a prism is introduced into a light beam, issued from an object point, and having passed through a microscope, it is preferably at a position in which the light rays of the beam, i.e. the rays incident on the prism, are parallel to one another, at least to within the paraxial approximation, insofar as it is necessary to minimize the optical defects or chromatic or geometric aberrations introduced by the prism into the light beam that it transmits.

By loss of spatial reference on a camera equipped with a matrix-array detector, what is meant is a movement, of the image of a point of the object with respect to the frame of reference formed by the grid of the matrix-array detector of the camera, larger than half the resolution limit of the imaging system in question, in the object space. It is known that such a movement may be induced by adding and/or removing an optical element to and/or from the assembly.

For an image that undergoes wavelength dispersion into a plurality of color images in the sense that each thereof is associated, on a monochromatic detector, with an unknown wavelength or a narrow wavelength interval about an unknown wavelength, the problem of loss of spatial reference is characterized by the fact that no color image at an unknown wavelength or in a narrow wavelength interval about an unknown wavelength remains stationary or moves by less than half the resolution limit of the imaging system in question, in the object space.

The problem of loss of spatial reference in imaging systems does not seem to have been identified in the prior art. The calibrating method proposed in the present patent application, which consists in isolating a known wavelength or a known spectrum using an interference filter the parallelism of which and the lighting conditions of which do not lead to a loss of spatial reference for this known wavelength or this known spectrum, therefore appears to be a means of recovering the spatial reference for this known wavelength or this known spectrum. This method is generalizable to all the known wavelengths or known spectra for which it is necessary to obtain a spatial reference, for example, it is generalizable to all the fluorophore spectra of a fluorescence microscopy system associating an arbitrary color (red, green, blue, etc.) of a color space with a fluorophore spectrum with a view to representing, in false colors, an image obtained with a monochromatic system, with the same resolution as the imaging system used without image wavelength dispersion.

From this point of view, it will be understood from the present patent application that the use of any dispersive element other than a simple prism, such as an association of prisms (in particular an Amici prism) or a grating, also forms part of the teaching of the present patent application, provided that it causes a loss of spatial reference at a wavelength or for a spectrum of interest in the color imaging system. This would thus in particular be the case for an element, such as a Michelson interferometer, that did not deviate light but that instead dispersed it, provided that its defects in terms of parallelism or its chromatic aberrations lead to a loss of spatial reference for the spectrum or wavelength in question.

The general inventive concept of the method of the present patent application may finally be said to be using a spectral filter that preserves the spatial reference on a monochromatic camera, to spatially and spectrally calibrate an imaging system incorporating an element that is dispersive spatially and in wavelength, i.e. establishing the spatial position of each wavelength or of the shape of each spectrum of interest on the matrix-array detector of the monochromatic camera, with a positioning error equal to or lower than the spatial resolution (or half the resolution depending on the chosen criterion) of the imaging system used to form the image on the camera.

It will be understood from the present patent application that the method may be implemented equivalently either by inserting, onto the imaging optical path, an element that preserves the spatial reference, or by inserting, onto the optical path, a calibrated element, i.e. an element that has had the change that it produces in the spatial reference measured with a precision that allows a known movement of the spatial reference to be determined with an error lower than the resolution of the imaging system so that it may therefore be subtracted in order to cancel out the perturbation of the component or element introduced.

For example, to use an interference filter comprising plates with planar and parallel faces for the calibration according to the method of the invention, it is possible, equivalently, to either require the tolerances thereof in terms of the parallelism between its two faces and of the planarity of each face be sufficiently low for this preservation to be achieved, or to evaluate the perturbation of the spatial reference of the spectrum of interest after its parallelism defects or to partially allow for this perturbation via computation via a measurement of the index and of the angle between the faces of the interference filter.

It will also be noted that the spectral transmission of an interference filter used for the calibration will preferably be narrow and centered on the emission spectrum of the fluorophore that will be used for the imaging, in order to obtain a calibration of the highest possible fidelity for the fluorophore in question. Such filters are known in the prior art.

The method of the invention may also be said to be a means of minimizing the action of an optical element that produces a geometric deviation that varies as a function of wavelength, which element is placed on an optical path, by adding to and removing from the optical path a spectral filter that produces a geometric deviation of zero as a function of wavelength, this seemingly being particularly paradoxical.

Considering the above elements, a prism in the context of the invention is any element that causes a relative chromatic dispersion of the images of a point of the object that is larger than one pixel of the camera or than the optical resolution in the object.

Considering the above elements, a filter or interference filter or optical filter in the context of the invention is any optical element the transmission of which varies as a function of wavelength, and the geometric deviation of which, in an imaging system, is, as a function of wavelength, zero or lower than half the spatial resolution of the imaging system.

The method of the invention is industrially applicable or usable for the spectral calibration of monochromatic imaging systems possessing a wavelength-dispersive element on their optical path.

For the purposes of the present patent application, in the optical device of the invention the word "between" in the expression "placed between" means, for an optical component C placed "between" an optical component A and an optical component B, that, in a normal operating mode of the device of the invention, the light routed from A to B, via an optical path, encounters first C before B or that the light conveyed from B to A on the optical path, via application of the principle of reversibility of the path of light, firstly encounters C before A. From this point of view, C is thus indeed located on the optical path provided for the light between A and B, or between B and A. In particular, the system or device of the invention is a so-called "non de-scanned" system in which a beamsplitter is located between a modulator and a microscope objective, in contrast to a so-called "de-scanned" system in which the modulator is between the beamsplitter and the microscope objective. This distinction is essential because, for a de-scanned system, the technical problem of the loss of the spatial reference during the introduction of a dispersive element is not terribly relevant since the modulator provides a spatial reference.

In the systems of the invention, the DMD or modulator is conjugated with an object plane for the illumination light (in FIG. 1, via the lens 6 at the object focal plane of which the DMD 1 is placed and via the microscope objective 2), whereas the object plane is conjugated with the plane of the detector of the camera for the fluorescence light of the object. In other words, in normal use of all the systems of the invention, the modulator is illuminated solely by an illumination light generated by a source, the object plane is illuminated solely by the illumination light, and the camera is illuminated solely by the fluorescence light, under illumination, of a fluorescent object placed in the object plane; no image of the modulator on the camera, which could serve as a spatial reference in the image of the object on the camera, is thus formed by the systems of the invention. The invention is applicable, as described above, to any fluorescence microscopy system using a modulator and a camera that are each conjugated with a given object plane, by an optical means that does not form any images of the modulator on the camera. It will however be understood that, in this patent application, the beamsplitter, which works in reflection in the illumination channel and in transmission in the fluorescence channel (or vice versa) and is associated with a single microscope objective that conjugates the modulator and the camera with a given side of the object plane, could equally well be replaced, equivalently, with a first microscope objective conjugating the modulator with one side of the object plane for the illumination and with a second microscope objective conjugating the other side of the object plane with the camera via a beamsplitter, which will remove the illumination light in order to ensure only fluorescence light reaches the camera, in the same way as described above for a single microscope objective.

It will be understood from the present patent application that any dispersive optical element (prism, grating, etc.) may be used equivalently to the prism described above, without departing from the scope of the teaching of the present patent application.

The invention claimed is:

1. A method for calibrating, at a first wavelength, a wide-field microscope, comprising the following steps:
   placing in a vicinity of an object plane an object medium able to emit fluorescence light in a first spectral band containing the first wavelength, in response to first illumination light,
   wherein the wide-field microscope comprises:
      a dichroic beamsplitter;
      a spatial modulator;
      a camera;
      a first optical channel that uses the spatial modulator to transmit the first illumination light;
      a second optical channel extending between the dichroic beamsplitter and the object plane in a three dimensional object medium able to emit fluorescence light in response to the first illumination light, wherein the second optical channel transmits the first illumination light and the fluorescence light, and wherein the dichroic beamsplitter is dichroic with respect to the first illumination light and fluorescence light;

a third optical channel extending between the dichroic beamsplitter and the camera, wherein the third optical channel transmits the fluorescence light from the dichroic beamsplitter to the camera that detects the fluorescence light, wherein the spatial modulator limits a field of the wide-field microscope, wherein the wide-field microscope further comprises an optical means for conjugating the spatial modulator with the object plane for the first illumination light and for conjugating the object plane with the camera for the fluorescence light, and wherein the third optical channel comprises an optical element that is dispersive to the fluorescence light, placing in the third optical channel a first interference filter able to spectrally select a vicinity of the first wavelength, sequentially illuminating, with the first illumination light, each point of the wide field of the wide-field microscope in the object plane, by means of the spatial modulator, recording a first image of each point of the wide field of the wide-field microscope, with the camera, removing the first interference filter from the third optical channel.

2. The method as claimed in claim 1, wherein the optical means comprises a microscope objective placed in the second optical channel.

3. The method as claimed in claim 1, wherein the optical means comprises a first microscope objective placed in the first optical channel and a second microscope objective placed in the second optical channel.

4. The method as claimed in claim 1, wherein the dispersive optical element is a prism.

5. The method as claimed in claim 1, wherein the spatial modulator is a digital micromirror device (DMD).

6. The method as claimed in claim 1, wherein the spatial modulator is a spinning disk.

7. The method as claimed in claim 1 for calibrating at a second wavelength the wide-field microscope, consisting in repeating the steps of claim 1 with a second interference filter able to spectrally select a vicinity of the second wavelength, in order to obtain a second image of each point of the wide field of the wide-field microscope, said second image being recorded with the second interference filter, on the camera.

8. A method for using the wide-field microscope and calibrated using the method of claim 7, comprising the following steps:

placing, in the vicinity of the object plane, a sample able to emit fluorescence light in a wavelength spectrum comprising the vicinity of the first wavelength and the vicinity of the second wavelength, in response to illumination light, illuminating the wide field of the wide-field microscope according to a grid of points, by means of the spatial modulator, recording an image of each point of the grid for the wavelength spectrum, with the camera, repeating the above two steps while applying translations to the grid in the wide field of the wide-field microscope, by means of the spatial modulator, until, for the wavelength spectrum, one image has been recorded of each point of the wide field of the wide-field microscope with the camera, deducing, by image processing, a first image of a point of the sample at the first wavelength, from the first image of this point at the first wavelength, said first image of the point being obtained using the calibrating method and the first image of this point for the wavelength spectrum, deducing, by image processing, a second image of the point of the sample at the second wavelength, from the first image of this point at the second wavelength, said image being obtained using the calibrating method and the image of this point for the wavelength spectrum.

9. The method as claimed in claim 8, for obtaining a spectral image of a sample, said spectral image being selected along an optical axis of the wide-field microscope, wherein the image processing comprises the following step:

removing the background contained in the images recorded by the camera.

* * * * *